United States Patent
Kitanaka et al.

(10) Patent No.: US 11,996,880 B2
(45) Date of Patent: May 28, 2024

(54) RADIO COMMUNICATION DEVICE, RADIO COMMUNICATION SYSTEM, CONTROL CIRCUIT, STORAGE MEDIUM, AND RADIO COMMUNICATION METHOD

(71) Applicant: Mitsubishi Electric Corporation, Tokyo (JP)

(72) Inventors: Shigenori Kitanaka, Tokyo (JP); Masatsugu Higashinaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 15 days.

(21) Appl. No.: 17/858,823

(22) Filed: Jul. 6, 2022

(65) Prior Publication Data
US 2022/0345176 A1    Oct. 27, 2022

Related U.S. Application Data

(63) Continuation of application No. PCT/JP2020/010176, filed on Mar. 10, 2020.

(51) Int. Cl.
| | |
|---|---|
| *H04B 1/715* | (2011.01) |
| *H04B 1/7136* | (2011.01) |
| *H04B 1/7156* | (2011.01) |
| *H04L 69/22* | (2022.01) |

(52) U.S. Cl.
CPC .......... *H04B 1/715* (2013.01); *H04B 1/7136* (2013.01); *H04B 1/7156* (2013.01); *H04L 69/22* (2013.01)

(58) Field of Classification Search
CPC .... H04B 1/715; H04B 1/7136; H04B 1/7156; H04B 2001/7154; H04L 69/22; Y02D 30/70
See application file for complete search history.

(56) References Cited

U.S. PATENT DOCUMENTS

| | | | | |
|---|---|---|---|---|
| 8,462,872 B2* | 6/2013 | Zhu | ...................... | H04L 25/0204 375/267 |
| 11,296,914 B2* | 4/2022 | Aio | ................... | H04W 72/0453 |
| 2003/0108008 A1 | 6/2003 | Agrawal et al. | | |
| 2016/0233998 A1* | 8/2016 | Sun | ....................... | H04B 17/336 |

(Continued)

FOREIGN PATENT DOCUMENTS

| | | | | |
|---|---|---|---|---|
| AU | 2009240650 A1 * | 10/2010 | .......... | H04J 11/0059 |
| JP | 5-130053 A | 5/1993 | | |

(Continued)

OTHER PUBLICATIONS

International Search Report for PCT/JP2020/010176 (PCT/ISA/210) dated Jul. 7, 2020.

(Continued)

*Primary Examiner* — Jean B Corrielus
(74) *Attorney, Agent, or Firm* — BIRCH, STEWART, KOLASCH & BIRCH, LLP

(57) ABSTRACT

A radio communication device switches a frequency channel to be used by using a predetermined hopping pattern during communication with a counterpart radio communication device, and includes a null determination unit that determines a position of a null symbol included in a received packet from the counterpart radio communication device and an interference measuring unit that measures an interference amount by using the null symbol included in the received packet.

4 Claims, 12 Drawing Sheets

(56) References Cited

U.S. PATENT DOCUMENTS

2017/0048086 A1\* 2/2017 Subramanian ...... H04L 27/2646
2018/0054343 A1\* 2/2018 Suzuki ................... H04L 5/008

FOREIGN PATENT DOCUMENTS

JP 3719254 B2 11/2005
JP 2007-312114 A 11/2007

OTHER PUBLICATIONS

Written Opinion of the International Searching Authority for PCT/JP2020/010176 (PCT/ISA/237) dated Jul. 7, 2020.
Chinese Office Action and Search Report for Chinese Application No. 202080097963.1 dated Aug. 30, 2023, with an English translation.

\* cited by examiner

US 11,996,880 B2

RADIO COMMUNICATION DEVICE, RADIO COMMUNICATION SYSTEM, CONTROL CIRCUIT, STORAGE MEDIUM, AND RADIO COMMUNICATION METHOD

CROSS-REFERENCE TO RELATED APPLICATION

This application is a continuation application of International Application PCT/JP2020/010176, filed on Mar. 10, 2020, and designating the U.S., the entire contents of which are incorporated herein by reference.

BACKGROUND OF THE INVENTION

1. Field of the Invention

The present disclosure relates to a radio communication device, a radio communication system, a control circuit, a storage medium, and a radio communication method that use frequency hopping.

2. Description of the Related Art

In recent years, with the development of radio communication, radio communication has been increasingly used for control between devices and the like for which cable communication was conventionally used. Use of radio communication for control, such effects as reduction in cost and improvement in maintenance efficiency can be expected.

In a case where a plurality of radio communication devices that are close to each other are present in a radio communication system, control needs to be performed so that frequency bands used by radio communication devices that perform communication at the same time do not overlap in order to avoid interference. For example, in a case where frequency hopping for switching frequency channels used for communication at high speeds from among predetermined frequency bands during communication is used, radio communication devices can communicate at the same time without interfering with each other by switching frequency channels to be used for communication by using different hopping patterns from each other in synchronization with each other.

When loss of synchronization is caused by failure or the like, however, a frequency channel that is used may overlap with that used by another radio communication device, which may cause interference. Japanese Patent No. 3719254 teaches a technology for a radio communication device, which switches the frequency channel that is used in accordance with a predetermined hopping pattern during communication, to reduce interference by measuring an interference amount by using a non-transmission section, and changing the hopping pattern when the interference amount has increased.

The technology taught by Japanese Patent No. 3719254, however, has a problem in that the transmission data rate lowers because a non-transmission section is provided during communication to measure the interference amount.

SUMMARY OF THE INVENTION

To solve the problem and achieve the object described above, a radio communication device according to the present disclosure switches a frequency channel to be used by using a predetermined hopping pattern during communication with a counterpart radio communication device, and includes: a null determination unit that determines a position of a null symbol included in a received packet from the counterpart radio communication device; and an interference measuring unit that measures an interference amount by using the null symbol included in the received packet.

DETAILED DESCRIPTION OF THE PREFERRED EMBODIMENTS

A radio communication device, a radio communication system, a control circuit, a storage medium, and a radio communication method according to an embodiment of the present disclosure will be described in detail below with reference to the drawings.

First Embodiment

Figure 1:
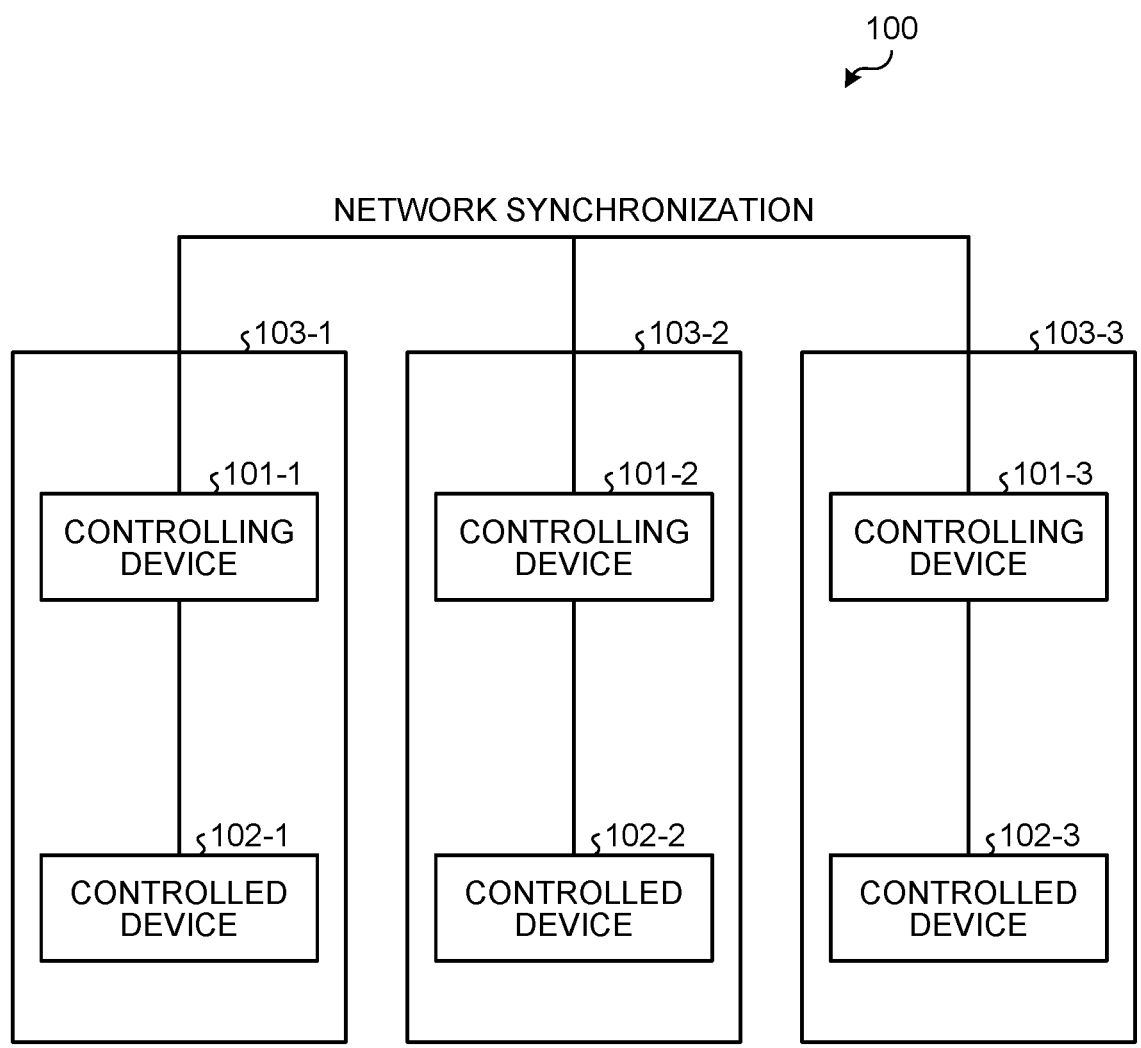
FIG. 1 is a diagram illustrating a configuration of a radio communication system according to a first embodiment.

FIG. 1 is a diagram illustrating a configuration of a radio communication system 100 according to a first embodiment. The radio communication system 100 includes a plurality of controlling devices 101-1, 101-2, and 101-3, and a plurality of controlled devices 102-1, 102-2, and 102-3. The controlling devices 101-1, 101-2, and 101-3 and the controlled devices 102-1, 102-2, and 102-3 are each an example of the radio communication device. The controlling device 101-1 and the controlled device 102-1 constitute a subsystem 103-1. The controlling device 101-2 and the controlled device 102-2 constitute a subsystem 103-2. The controlling device 101-3 and the controlled device 102-3 constitute a subsystem 103-3.

The subsystems 103-1, 103-2, and 103-3 each perform radio communication with a counterpart radio communication device while switching a frequency channel to be used by using a predetermined hopping pattern. Note that a counterpart radio communication device of the controlling device 101-1 is the controlled device 102-1, a counterpart radio communication device of the controlling device 101-2 is the controlled device 102-2, and a counterpart radio communication device of the controlling device 101-3 is the controlled device 102-3. For example, the controlling device 101-1 transmits commands for controlling the counterpart controlled device 102-1 via radio communication. The controlled device 102-1 transmits data such as control responses to the controlling device 101-1 via radio communication. The controlling device 101-2 transmits commands for controlling the counterpart controlled device 102-2 via radio communication. The controlled device 102-2 transmits data such as control responses to the controlling device 101-2 via radio communication. The controlling device 101-3 transmits commands for controlling the counterpart controlled device 102-3 via radio communication. The controlled device 102-3 transmits data such as control responses to the controlling device 101-3 via radio communication. The controlling devices 101-1, 101-2, and 101-3 are in network synchronization, and the operation timings thereof are synchronous with each other.

Figure 2:
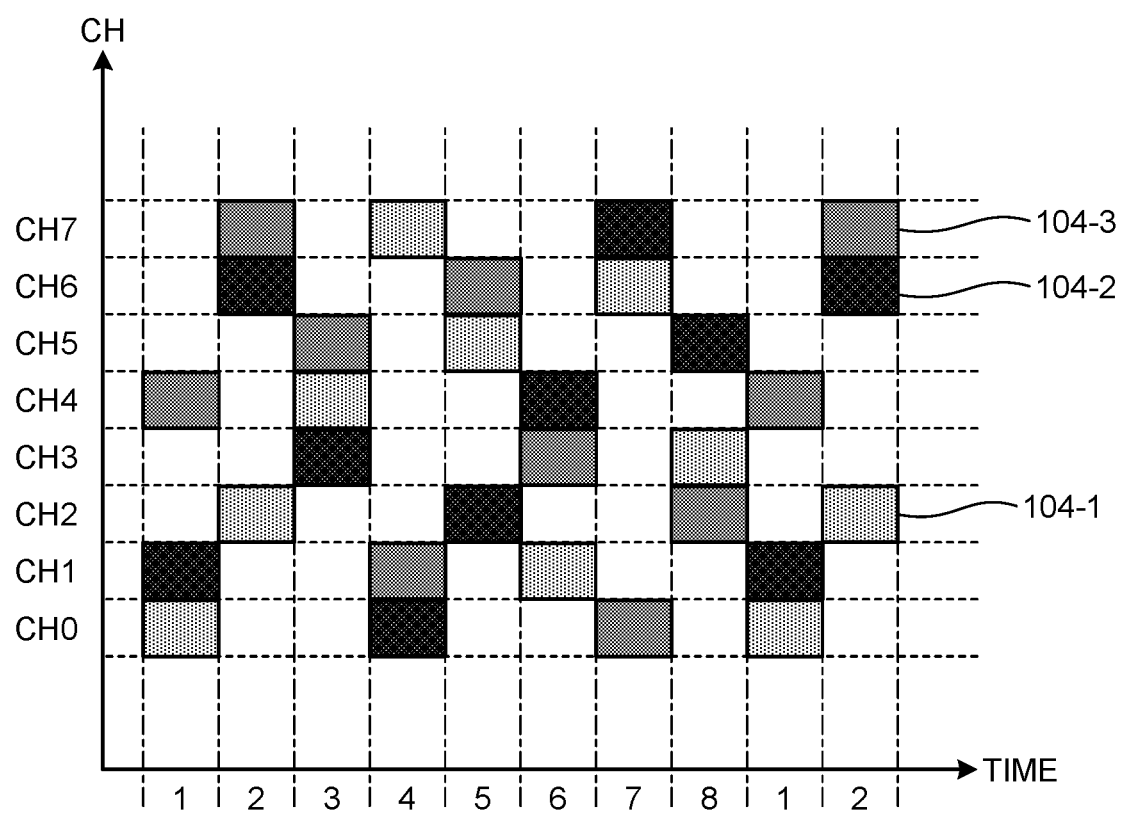
FIG. 2 is a graph illustrating frequency channels used by the radio communication system illustrated in FIG. 1.

FIG. 2 is a graph illustrating frequency channels used by the radio communication system 100 illustrated in FIG. 1. In the example illustrated in FIG. 2, eight channels CH0 to CH7 are used. The subsystems 103-1, 103-2, and 103-3 use different hopping patterns from each other, and when synchronization is achieved, the frequency channels that are used at the same time do not overlap with each other. In a hopping pattern 104-1 of the subsystem 103-1, the frequency channel that is used changes in an order of channels CH0, CH2, CH4, CH7, CH5, CH1, CH6, and CH3. In a hopping pattern 104-2 of the subsystem 103-2, the frequency channel that is used changes in an order of channels CH1, CH6, CH3, CH0, CH2, CH4, CH7, and CH5. In a hopping pattern 104-3 of the subsystem 103-3, the frequency channel that is used changes in an order of channels CH4, CH7, CH5, CH1, CH6, CH3, CH0, and CH2. In the description above, the hopping patterns in which frequency channel that is used changes in the same order but which are shifted by three channels from each other are used, the present embodiment is not limited to this example. It is only needed that frequency channels that are used at the same time do not overlap with each other when synchronization is achieved.

Figure 3:
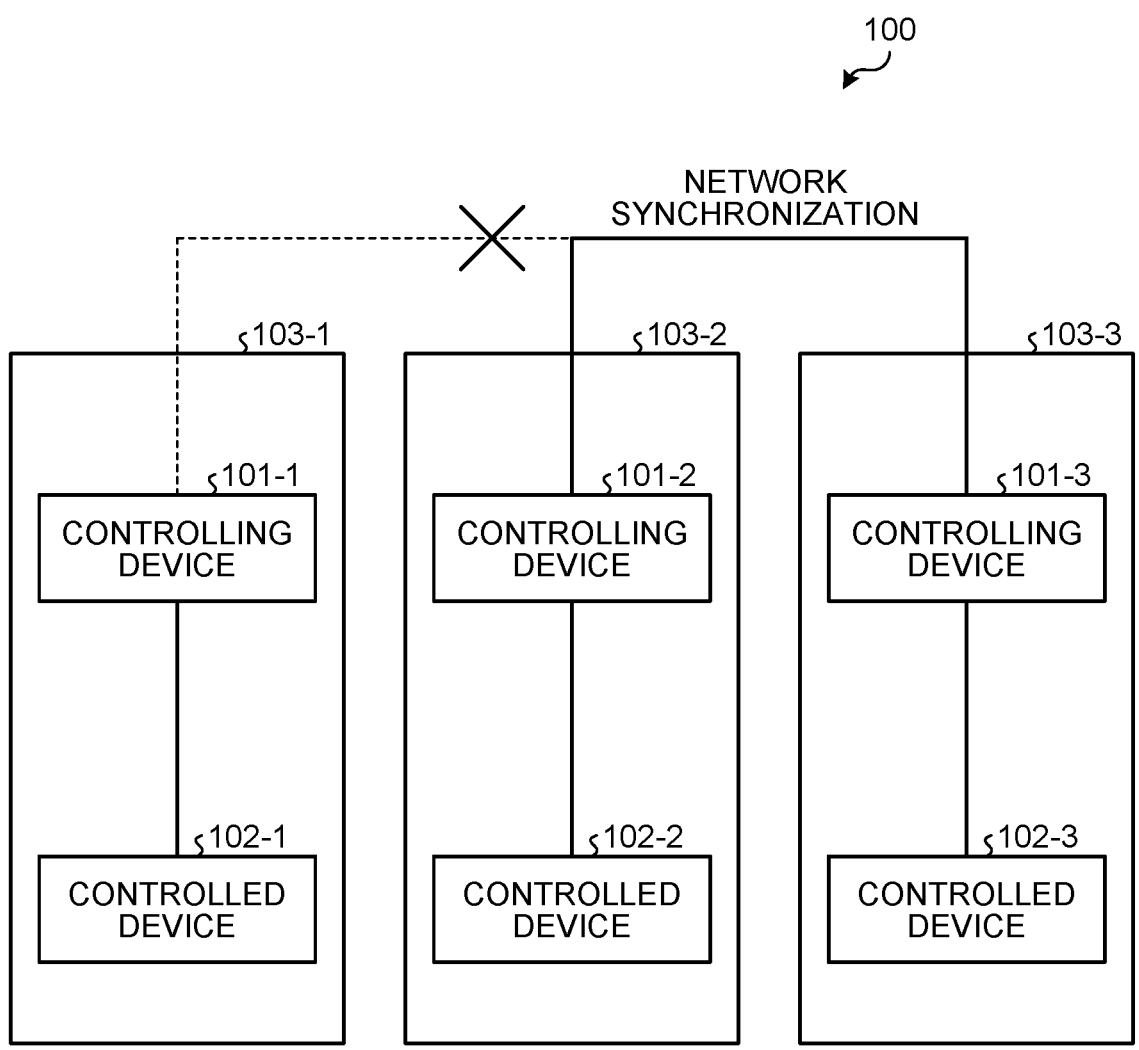
FIG. 3 is a diagram illustrating a state of loss of synchronization in the radio communication system illustrated in FIG. 1.
Figure 4:
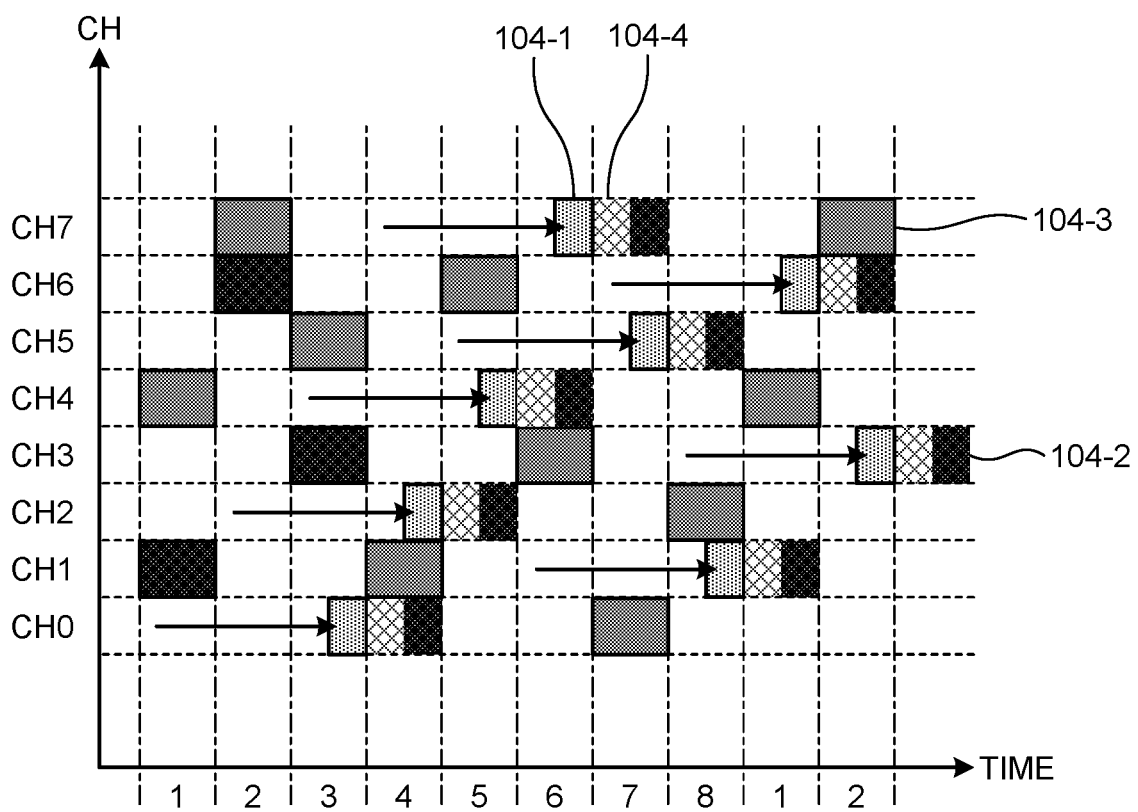
FIG. 4 is a graph illustrating frequency channels used by the radio communication system in the state illustrated in FIG. 3.

FIG. 3 is a diagram illustrating a state of loss of synchronization in the radio communication system 100 illustrated in FIG. 1. FIG. 3 illustrates a state in which the subsystem 103-1 has lost network synchronization owing to failure or the like. FIG. 4 is a graph illustrating frequency channels used by the radio communication system 100 in the state illustrated in FIG. 3. In this state, the subsystems 103-2 and 103-3 are in synchronization, and the frequency channels that are used at the same time do not overlap between the subsystems 103-2 and 103-3 as in the state illustrated in FIG. 2. The subsystem 103-1 that has lost synchronization is delayed by about two to three sequences, and in this case, an overlap 104-4 of a frequency channel with the subsystem 103-2 occurs. In the present embodiment, when loss of synchronization is detected, transmission timings are adjusted, so that overlaps of frequency channels are reduced. Hereinafter, a configuration for reducing overlaps of frequency channels will be described.

Figure 5:
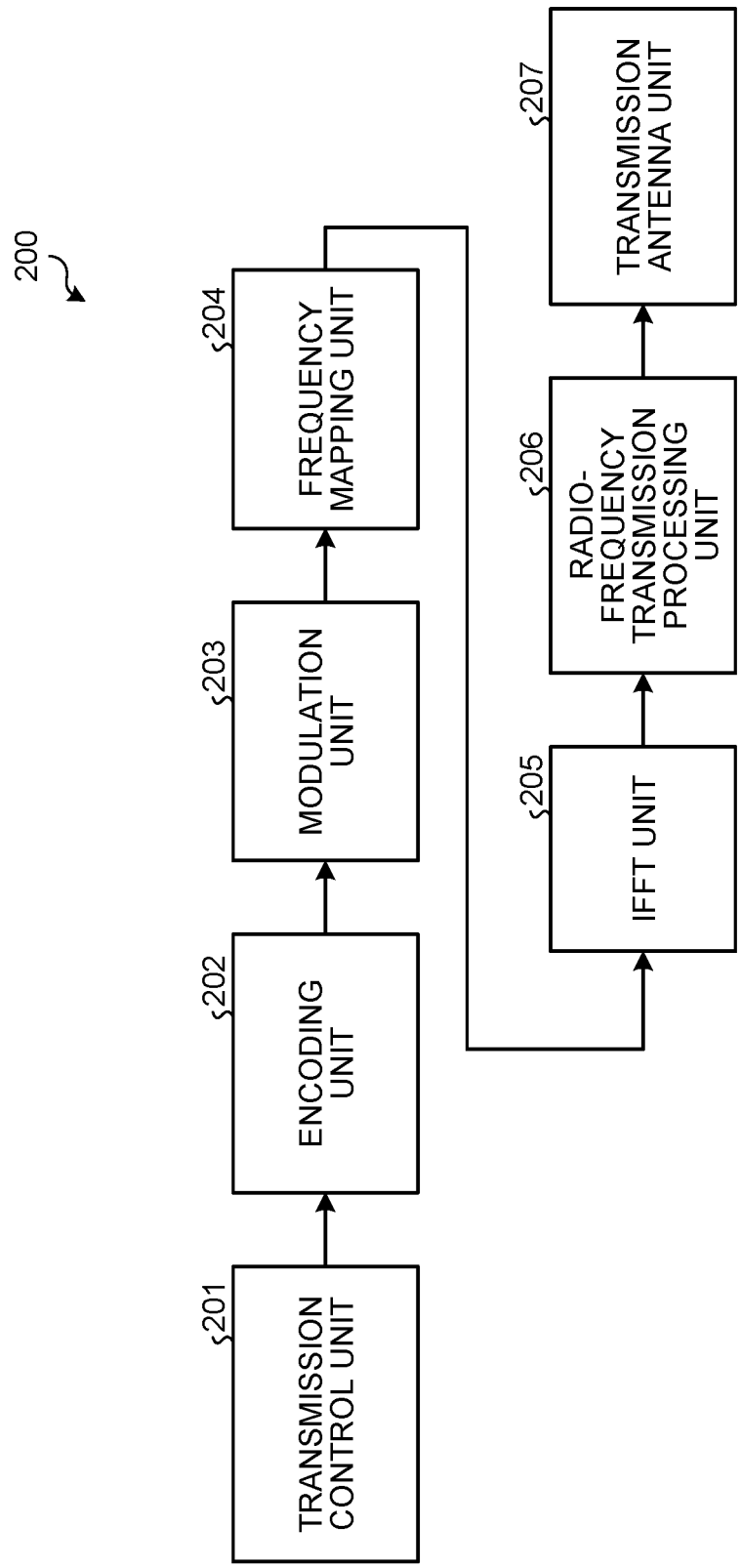
FIG. 5 is a diagram illustrating a configuration of a transmission device included in the radio communication device illustrated in FIG. 1.

FIG. 5 is a diagram illustrating a configuration of a transmission device 200 included in the radio communication device illustrated in FIG. 1. The transmission device 200 includes a transmission control unit 201, an encoding unit 202, a modulation unit 203, a frequency mapping unit 204, an inverse fast Fourier transform (IFFT) unit 205, a radio-frequency transmission processing unit 206, and a transmission antenna unit 207.

The transmission control unit 201 performs transmission instruction, and the transmission device 200 thus starts transmission processing. At the start of transmission, the encoding unit 202 performs an encoding process on information bits, and outputs a signal resulting from encoding to the modulation unit 203. The modulation unit 203 performs a modulation process on the signal by using phase shift keying (PSK) modulation, for example, and outputs the modulated signal to the frequency mapping unit 204.

Figure 6:
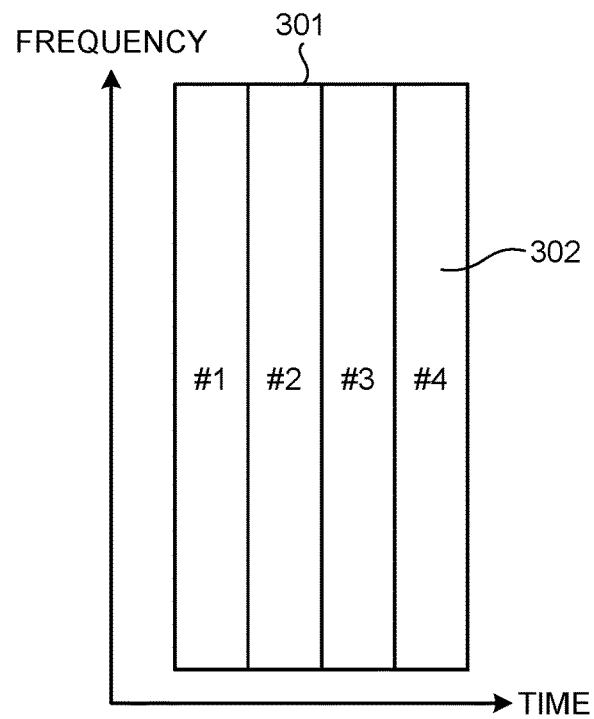
FIG. 6 is a diagram illustrating a structure of a transmission packet of the transmission device illustrated in FIG. 5.
Figure 7:
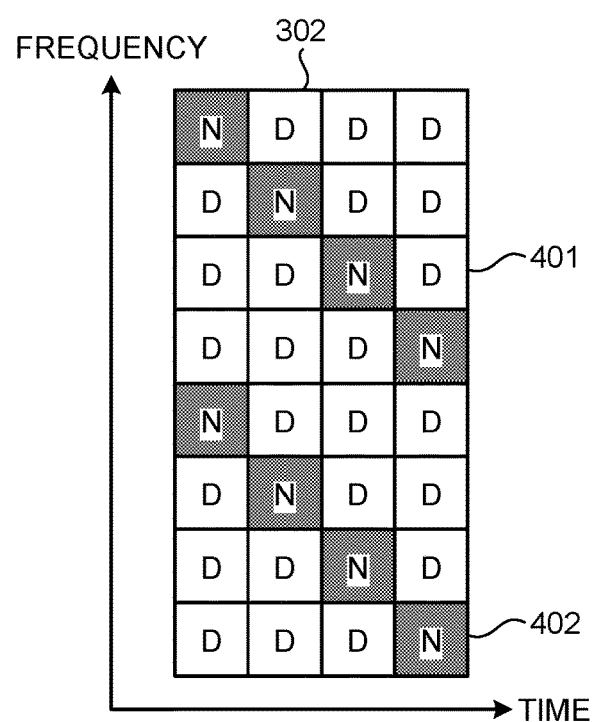
FIG. 7 is a diagram illustrating a structure of orthogonal frequency division multiplexing (OFDM) symbols illustrated in FIG. 6.

The frequency mapping unit 204 maps the modulated signal to subcarriers to be transmitted. In this case, the frequency mapping unit 204 arranges null symbols with the modulated signal. FIG. 6 is a diagram illustrating a structure of a transmission packet 301 of the transmission device 200 illustrated in FIG. 5. One transmission packet 301 includes a plurality of OFDM symbols 302, which are modulation symbols, which are four OFDM symbols 302 herein. FIG. 7 is a diagram illustrating a structure of the OFDM symbols 302 illustrated in FIG. 6. One OFDM symbol 302 is constituted by a total of 32 symbols including eight subcarriers arranged in a frequency axis direction and four symbols arranged in a time axis direction. Frequency mapping is performed on the modulated signal 401 and the null symbols 402 in the OFDM symbols 302.

FIG. 7 illustrates an example in which a null symbol 402 is arranged at every fourth subcarrier for a modulated signal 401, and the null symbols 402 are each shifted by one offset in the subcarrier direction from the previous null symbol 402 in the time axis direction. Mapping of the null symbols 402 in the transmission packet 301 before transmission enables the null symbols 402 to be used for measurement of the interference amount at the receiving end.

Note that, when the positions of null symbols 402 in a plurality of transmission packets 301 that are transmitted at the same time in the radio communication system 100, if the transmission packets 301 completely overlap with each other owing to loss of synchronization, the positions of the null symbols 402 completely overlap each other, and the interference amount cannot be measured. Thus, the positions to which the frequency mapping unit 204 adds null symbols 402 in the transmission packet 301 differ among the subsystems 103-1, 103-2, and 103-3, so that the state in the interference amount cannot be measured as described above can be avoided.

The description refers back to FIG. 5. The frequency mapping unit 204 outputs a signal resulting from the frequency mapping process to the IFFT unit 205. The IFFT unit 205 performs inverse Fourier transform on the signal resulting from the frequency mapping process, and outputs a signal resulting from the inverse Fourier transform to the radio-frequency transmission processing unit 206. The signal output by the IFFT unit 205 is a digital signal. The radio-frequency transmission processing unit 206 converts the digital signal into an analog signal. In addition, the radio-frequency transmission processing unit 206 converts the frequency of the analog signal into a carrier frequency, and transmits the analog signal from the transmission antenna unit 207.

Figure 8:
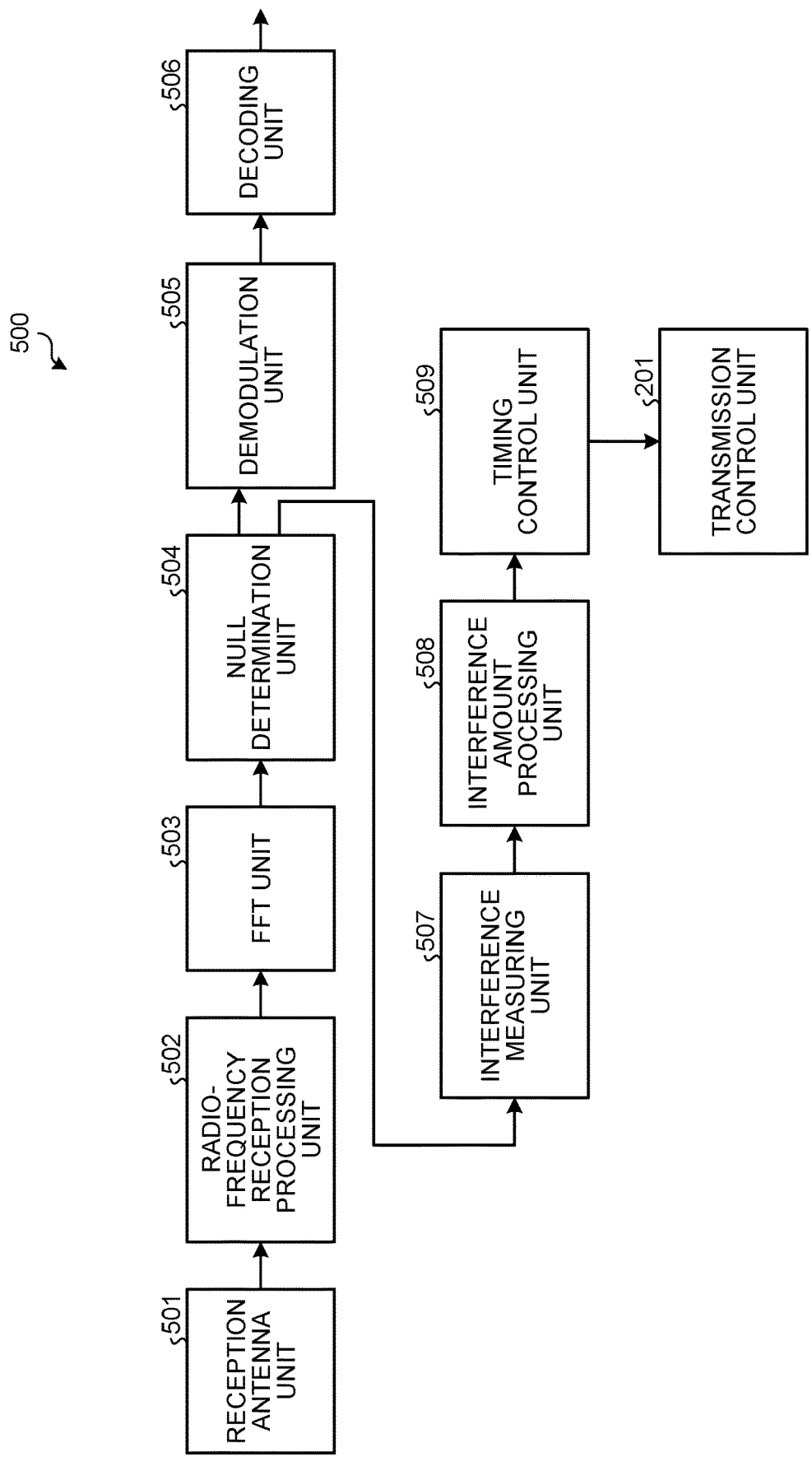
FIG. 8 is a diagram illustrating a configuration of a reception device included in the radio communication device illustrated in FIG. 1.

FIG. 8 is a diagram illustrating a configuration of a reception device 500 included in the radio communication device illustrated in FIG. 1. The reception device 500 includes a reception antenna unit 501, a radio-frequency reception processing unit 502, a fast Fourier transform (FFT) unit 503, a null determination unit 504, a demodulation unit 505, a decoding unit 506, an interference measuring unit 507, an interference amount processing unit 508, and a timing control unit 509.

The reception antenna unit 501 receives a signal transmitted by the transmission device 200, and outputs the received signal to the radio-frequency reception processing unit 502. The radio-frequency reception processing unit 502 adjusts the level of the received signal, which is an analog signal. The radio-frequency reception processing unit 502 also converts the frequency of the received signal into a baseband. The radio-frequency reception processing unit 502 also converts the analog signal into a digital signal, and outputs the digital signal to the FFT unit 503. The FFT unit 503 performs Fourier transform on the received signal, and outputs the resulting signal to the null determination unit 504.

The null determination unit 504 determines the positions of null symbols included in a received packet in the received signal. In the received packet, the modulated signal 401 and the null symbols 402 are mapped as illustrated in FIG. 7. The null determination unit 504 determines whether each symbol in the received packet is the modulated signal 401 or the null symbol 402, outputs the modulated signal 401 to the demodulation unit 505, and outputs the null symbols 402 to the interference measuring unit 507.

The demodulation unit 505 performs a demodulation process on the received signal, and outputs the received signal resulting from the demodulation process to the decoding unit 506. The decoding unit 506 performs a decoding process on the received signal resulting from the demodulation process, and outputs the decoded data.

The interference measuring unit 507 measures the interference amount by using the null symbols 402 output by the null determination unit 504. Because the value of a null symbol 402 at the time of transmission is "0", a value measured by using the null symbol 402 corresponds to the interference amount at the arrangement position at the time and frequency of the null symbol 402. The interference measuring unit 507 outputs a measured value of the interference amount at each null symbol 402 to the interference amount processing unit 508.

The interference amount processing unit 508 processes the measured interference amount at each null symbol 402 to generate a value to be used for calculating a control amount of transmission timing. For example, the interference amount processing unit 508 averages the interference amounts at each predetermined packet position, and outputs the average value to the timing control unit 509. The interference amount processing unit 508 can average the interference amounts for each OFDM symbol 302 illustrated in FIG. 6, for example. In a case where the OFDM symbol 302 has the structure illustrated in FIG. 7, the interference amount processing unit 508 averages eight measured values of the interference amounts.

The timing control unit 509 calculates a control amount of transmission timing at which a transmission packet is to be transmitted on the basis of the interference amounts. The timing control unit 509 estimates a control amount of transmission timing by using temporal transition of the interference amounts obtained by plotting, for each received packet, the interference amounts averaged for each OFDM symbol 302 by the interference amount processing unit 508, for example. The timing control unit 509 outputs the calculated control amount of transmission timing to the transmission control unit 201.

Figure 9:
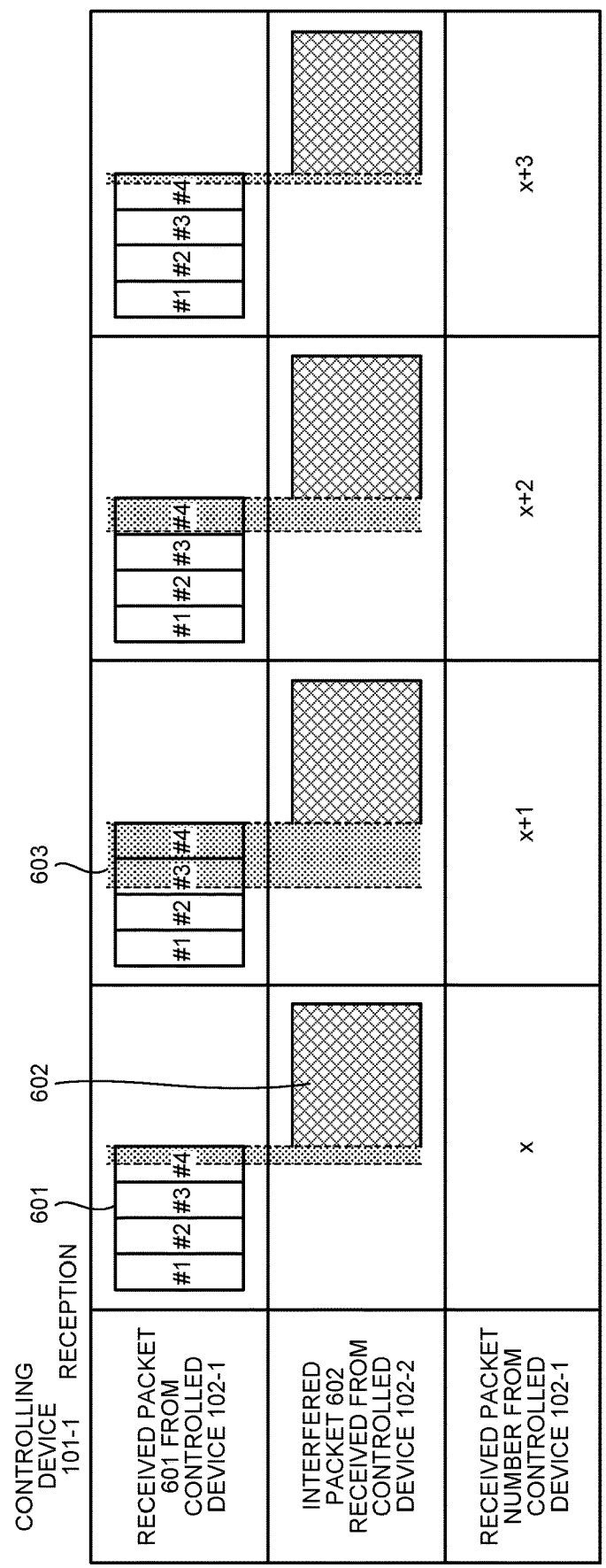
FIG. 9 is a diagram illustrating a first example of an interference state when the reception device illustrated in FIG. 8 corrects transmission timing.

Next, correction of transmission timing performed by the timing control unit 509 will be explained. In the present embodiment, assume that the controlled devices 102-1 to 102-3 each include at least the transmission device 200, and the controlling devices 101-1 to 101-3 each include the reception device 500 and the transmission device 200. Note that FIG. 9 is a diagram illustrating a first example of an interference state when the reception device 500 illustrated in FIG. 8 corrects transmission timing. FIG. 9 illustrates packets received by the controlling device 101-1 that has lost synchronization. In addition, assume here that the transmission device 200 of the controlled device 102-1 has added null symbols 402 to the transmission packet 301. At a received packet number x from the controlled device 102-1, the reception timing of a received packet 601 from the controlled device 102-1 received by the controlling device 101-1 that has lost synchronization is delayed. Thus, the received packet 601 interferes with an interfered packet 602, which is a received packet from the controlled device 102-2.

Figure 10:
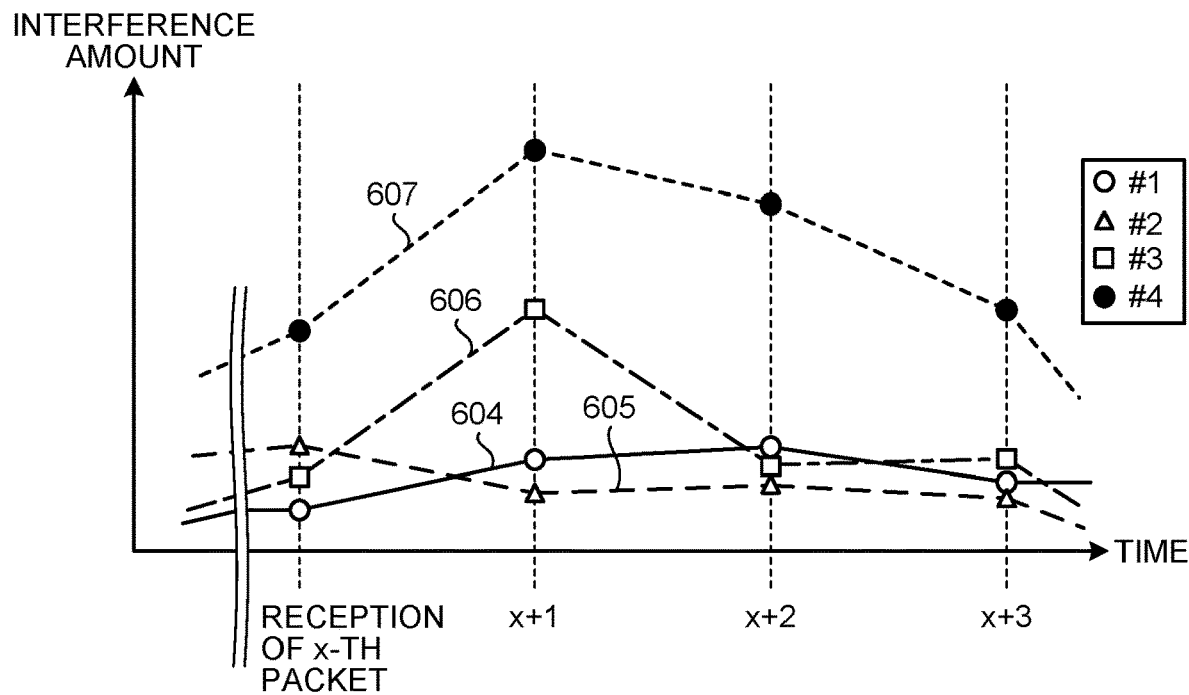
FIG. 10 is a graph illustrating interference amounts measured by a controlling device that has lost synchronization in the state illustrated in FIG. 9.

FIG. 10 is a graph illustrating interference amounts measured by the controlling device 101-1 that has lost synchronization in the state illustrated in FIG. 9. Here, when receiving the received packet 601, the reception device 500 of the controlling device 101-1 measures interference amounts by using the null symbols 402, and transitions of the interference amounts averaged for each OFDM symbol 302 are illustrated. FIG. 10 illustrates interference amounts 604 of a first OFDM symbol 302, interference amounts 605 of a second OFDM symbol 302, interference amounts 606 of a third OFDM symbol 302, and interference amounts 607 of a fourth OFDM symbol 302.

When the interference amounts are averaged for each OFDM symbol 302 in the x-th received packet, the x-th received packet overlap with part of a received packet from the controlled device 102-2 because reception of packets from the controlled device 102-1 is delayed, and the interference amount 607 of the fourth OFDM symbol 302 is thus measured. In this case, the reason why the interference amounts 604, 605, and 606 are not "0" is considered to be because interference from outside the radio communication system 100 is measured.

With reference to FIG. 9, at the x+1-th received packet 601, reception of packets from the controlled device 102-1 is further delayed, and an interference range 603 of the received packet 601 from the controlled device 102-1 and the interfered packet 602 increases. As a result, not only the fourth OFDM symbol 302 but also the third OFDM symbol 302 of the received packet 601 interferes with the interfered packet 602. With reference to FIG. 10, in the received packet x+1, the interference amount 607 of the fourth OFDM symbol 302 and the interference amount 606 of the third OFDM symbol 302 have increased, and the changes in the interference amount 604 of the first OFDM symbol 302 and the interference amount 605 of the second OFDM symbol 302 are smaller than those of the interference amounts 606 and 607. At this point, the timing control unit 509 determines that the transmission timing of the subsystem 103-1 that has lost synchronization is delayed on the basis of the temporal transitions of the interference amounts 604 to 607 because the interference amounts increase from the end of the received packet 601, and outputs a control amount for making the transmission timing earlier to the transmission control unit 201 of the controlling device 101-1. The method for calculating the control amount will be described later. The transmission control unit 201 of the controlling device 101-1 controls the transmission timing on the basis of the input control amount, and thus the reception timing at the controlled device 102-1 is also corrected, which reduces interference. In addition, because the transmission timing of subsequent transmission from the controlled device 102-1 is also corrected accordingly, the communication timing of the entire subsystem 103-1 can be corrected, which achieves reduction in intra-system interference with the other subsystems 103-2 and 103-3 in the radio communication system 100.

With reference to FIG. 9, at the x+2-th received packet 601, as a result of adjustment of the transmission timing, the reception timing of the received packet 601 from the controlled device 102-1 is made to be earlier, the third OFDM symbol 302 of the received packet 601 does not interfere with the interfered packet 602, and the interference range 603 of the fourth OFDM symbol 302 and the interfered packet 602 is smaller. With reference to FIG. 10, the interference amount 606 of the third OFDM symbol 302 and the interference amount 607 of the fourth OFDM symbol 302 have decreased. In particular, the interference amount 606 of the third OFDM symbol 302 is lowered to the same level as the interference amounts 604 and 605. At this point, the timing control unit 509 determines that the transmission timing of the subsystem 103-1 that has lost synchronization is still delayed because the interference amount 607 is still large, and outputs a control amount for making the transmission timing earlier to the transmission control unit 201.

With reference to FIG. 9, at the x+3-th received packet 601, as a result of further adjustment of the transmission timing, the reception timing of the received packet 601 from the controlled device 102-1 is further made to be earlier, and the interference range 603 of the fourth OFDM symbol 302 of the received packet 601 and the interfered packet 602 is still smaller. With reference to FIG. 10, the interference amount 607 of the fourth OFDM symbol 302 is still smaller than that in the x+2-th received packet 601. Herein, because the interference amount 607 is still present at the x+3-th received packet 601, the adjustment of transmission timing is further repeated, so that the interference amount 607 can be further reduced.

Figure 11:
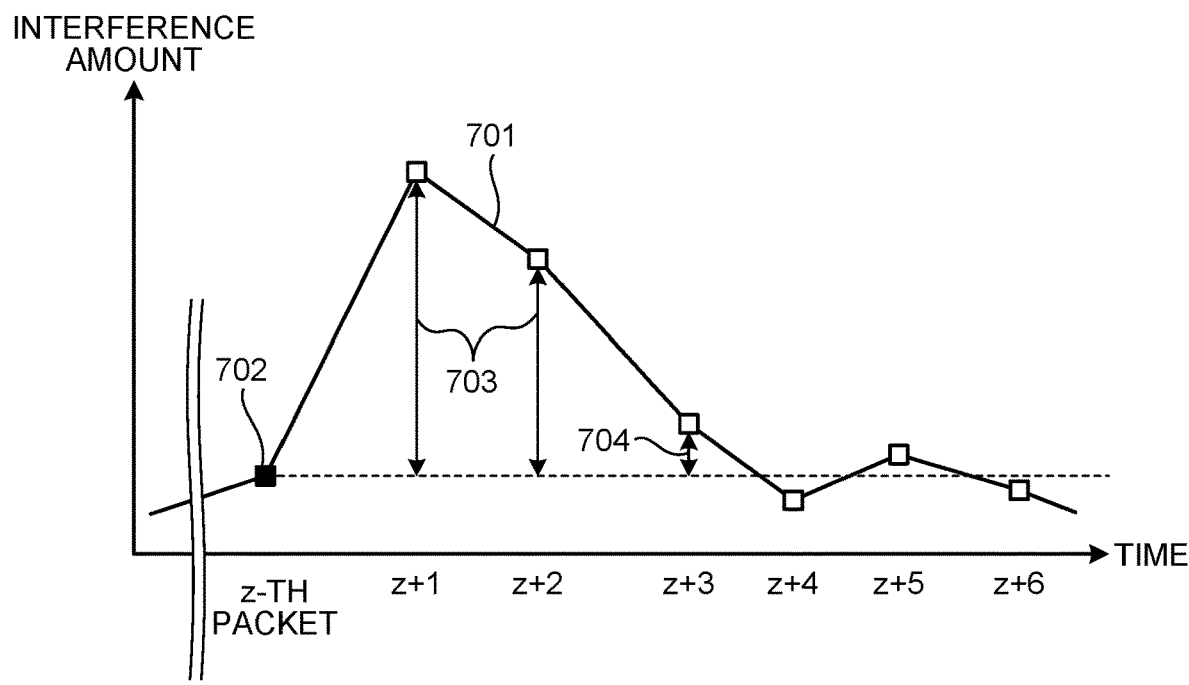
FIG. 11 is a graph for explaining determination on termination of transmission timing adjustment performed by the reception device illustrated in FIG. 8.

FIG. 11 is a graph for explaining determination on termination of transmission timing adjustment performed by the reception device 500 illustrated in FIG. 8. When the slope of the temporal transition of an interference amount 701 of an OFDM symbol 302 in a received packet 601 has become equal to or larger than a first threshold, the timing control unit 509 starts adjustment of transmission timing. Assume that the received packet 601 at the point when the slope of the temporal transition of the interference amount 701 has become equal to or larger than the first threshold is a z-th received packet 601. At this point, the timing control unit 509 holds the interference amount of the z-th received packet 601 as a termination determination value 702. The timing control unit 509 calculates the difference between the interference amount 701 and the termination determination value 702, and repeats the calculation of a control value until the calculated difference becomes equal to or smaller than a second threshold. When the difference between the interference amount 701 and the termination determination value 702 has become equal to or smaller than the second threshold, the timing control unit 509 terminates calculation of a control amount. In the example of FIG. 11, at the z+1-th received packet 601 and at the z+2-th received packet 601, the difference between the interference amount 701 and the termination determination value 702 is a correction continuation value 703 larger than the second threshold. At the z+3-th received packet 601, the difference between the interference amount 701 and the termination determination value 702 is a correction termination value 704, which is equal to or smaller than the second threshold.

Calculation of a control value performed by the reception device 500 illustrated in FIG. 8 will be explained. The interference measuring unit 507 calculates interference amounts for each OFDM symbol 302. In the present embodiment, the subsystems 103-1, 103-2, and 103-3 in the radio communication system 100 are managed by the same administrator. Thus, the administrator knows in advance the transmission powers of the subsystems 103-1, 103-2, and 103-3. A maximum interference amount observed by one null symbol when packets overlap with each other can therefore be calculated. Similarly, even when all the OFDM symbols 302 overlap, a maximum interference amount to be observed can be calculated. For example, as illustrated in FIG. 7, in a case where four symbols are arranged in the time axis direction in one OFDM symbol 302, the timing control unit 509 calculates a correction amount for each OFDM symbol indicating how many symbols in the time axis direction should be corrected on the basis of the measured interference amount by using a value obtained by dividing the maximum interference amount of one OFDM symbol 302 by four. The timing control unit 509 adds the results of calculation for all the OFDM symbols 302 that needs to be corrected to calculate a control amount of transmission timing.

Figure 12:
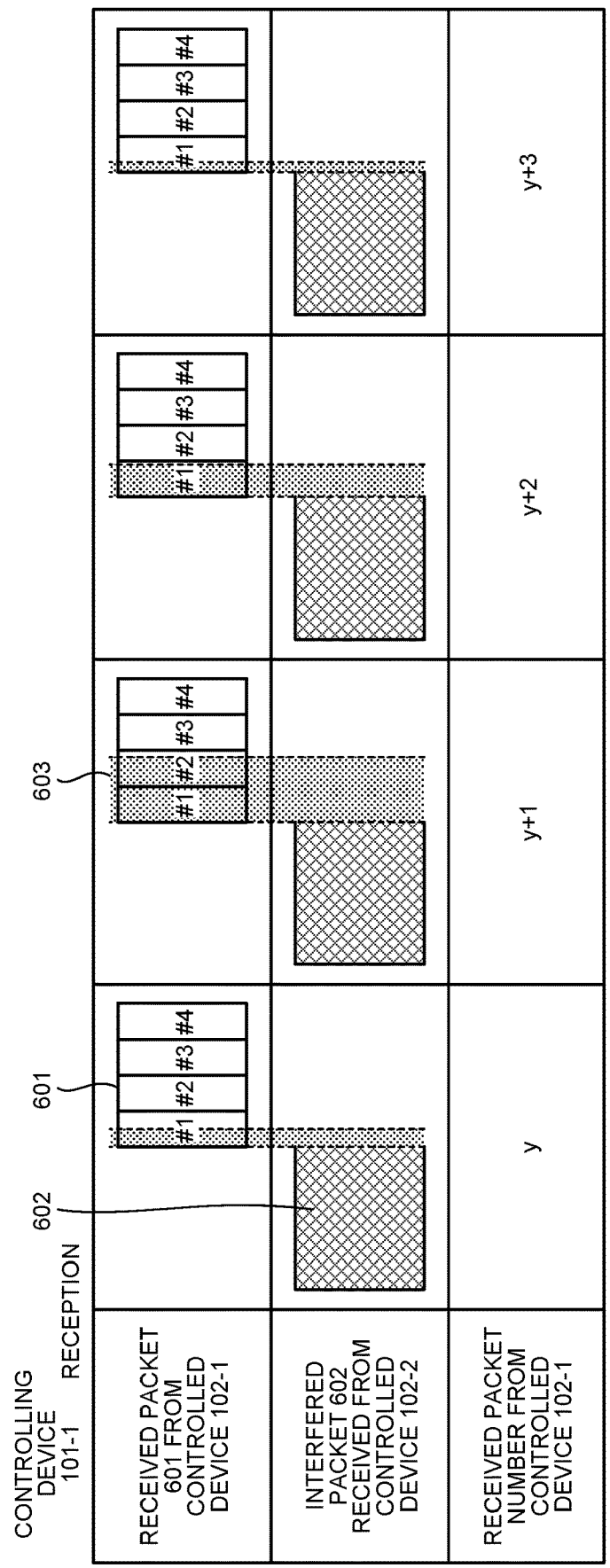
FIG. 12 is a diagram illustrating a second example of an interference state when the reception device illustrated in FIG. 8 corrects transmission timing.

FIG. 12 is a diagram illustrating a second example of an interference state when the reception device 500 illustrated in FIG. 8 corrects transmission timing. In the second example, unlike the first example illustrated in FIG. 9, the transmission timing of the subsystem 103-1 becomes gradually earlier owing to loss of synchronization, and a received packet 601 thus overlaps with an interfered packet 602.

Figure 13:
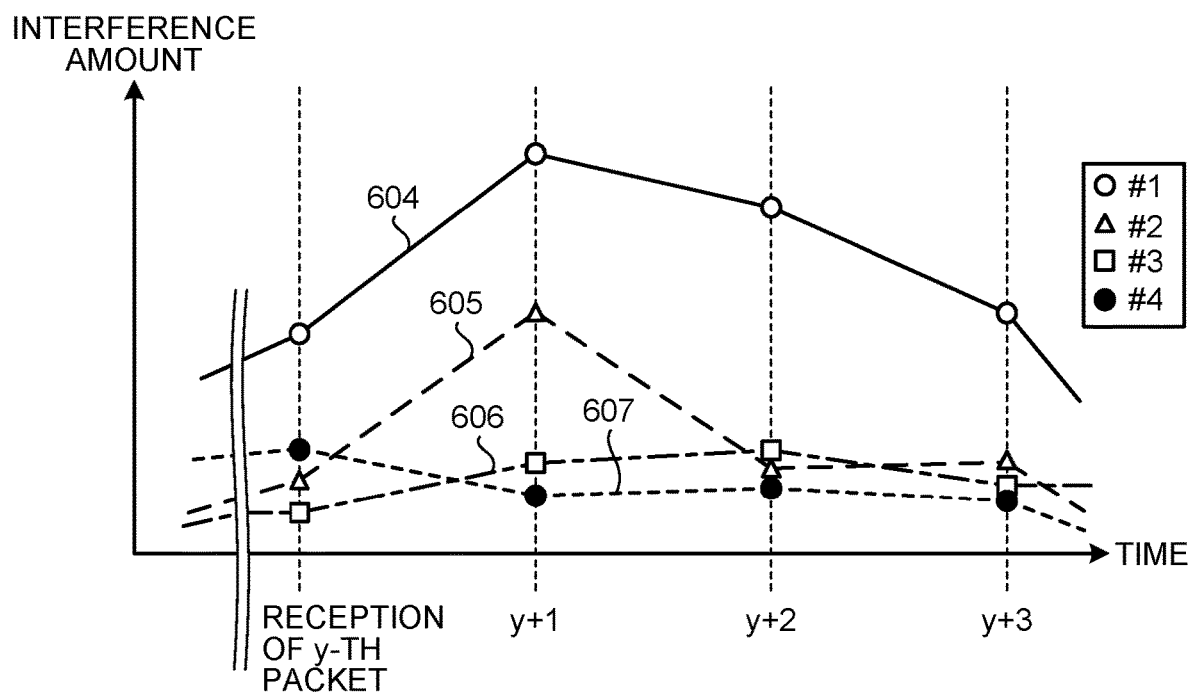
FIG. 13 is a graph illustrating interference amounts measured by a controlling device that has lost synchronization in the state illustrated in FIG. 12.

FIG. 13 is a graph illustrating interference amounts measured by the controlling device 101-1 that has lost synchronization in the state illustrated in FIG. 12. In the second example illustrated in FIG. 12, because the transmission timing of the subsystem 103-1 has become earlier, the received packet 601 overlaps with the interfered packet 602 from the first OFDM symbol 302, which is the head side thereof.

With reference to FIG. 12, at the y-th received packet 601, the first OFDM symbol 302 of the received packet 601 interferes with the interfered packet 602. In this case, with reference to FIG. 13, the interference amount 604 of the first OFDM symbol 302 is larger than the interference amounts 605 to 607 of the second to fourth OFDM symbols 302. Note that, because specific operations of the timing control unit 509 are similar to those in the first example, detailed explanation thereof will not be repeated, and brief explanation thereof will be provided.

Subsequently, at the y+1-th received packet 601, with reference to FIG. 12, the interference range 603 has further increased, and the first and second OFDM symbols 302 of the received packet 601 overlap with the interfered packet 602. In this case, with reference to FIG. 13, the interference amount 604 of the first OFDM symbol 302 and the interference amount 605 of the second OFDM symbol 302 have increased. The amounts of change in the interference amounts 606 and 607 are smaller than those of the interference amounts 604 and 605. At this point, the timing control unit 509 determines that the transmission timing of the subsystem 103-1 that has lost synchronization has become earlier on the basis of the temporal transitions of the interference amounts 604 to 607 because the interference amounts increase from the head of the received packet 601, and outputs a control amount for making the transmission timing later to the transmission control unit 201.

With reference to FIG. 12, at the y+2-th received packet 601, as a result of adjustment of the transmission timing, the interference range 603 has decreased, the second OFDM symbol 302 of the received packet 601 does not overlap with the interfered packet 602, and the first OFDM symbol 302 of the received packet 601 still overlaps with the interfered packet 602. In this case, with reference to FIG. 13, the interference amount 605 of the second OFDM symbol 302 is reduced to the same level as the interference amounts 606 and 607. Because the interference amount 604 of the first OFDM symbol 302 is reduced as compared with that in the y+1-th received packet 601 but is still larger than the interference amounts 605 to 607, the timing control unit 509 continues adjustment of transmission timing.

With reference to FIG. 12, at the y+3-th received packet 601, as a result of adjustment of transmission timing, the interference range 603 has further decreased, but the first OFDM symbol 302 still overlaps with the interfered packet 602. In this case, with reference to FIG. 13, because the interference amount 604 of the first OFDM symbol 302 is reduced as compared with that in the y+2-th received packet 601 but is still larger than the interference amounts 605 to 607, the timing control unit 509 continues adjustment of transmission timing. Although not illustrated, the adjustment of transmission timing is continued at the y+4-th and subsequent received packets 601 until the interference amounts meet the condition.

Next, a hardware configuration of the transmission device 200 and the reception device 500 according to the first embodiment will be described. The functions of the transmission device 200 and the reception device 500 are implemented by processing circuitry. The processing circuitry may be implemented by dedicated hardware, or may be a control circuit using a central processing unit (CPU).

Figure 14:
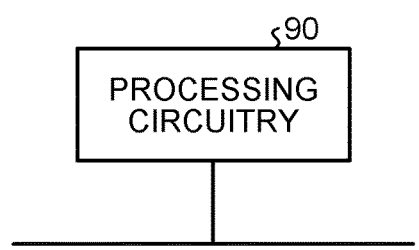
FIG. 14 is a diagram illustrating dedicated hardware for implementing the functions of the transmission device and the reception device according to the first embodiment.

In a case where the processing circuitry is implemented by dedicated hardware, the functions are implemented by processing circuitry 90 illustrated in FIG. 14. FIG. 14 is a diagram illustrating dedicated hardware for implementing the functions of the transmission device 200 and the reception device 500 according to the first embodiment. The processing circuitry 90 is a single circuit, a composite circuit, a programmed processor, a parallel-programmed processor, an application specific integrated circuit (ASIC), a field programmable gate array (FPGA), or a combination thereof.

Figure 15:
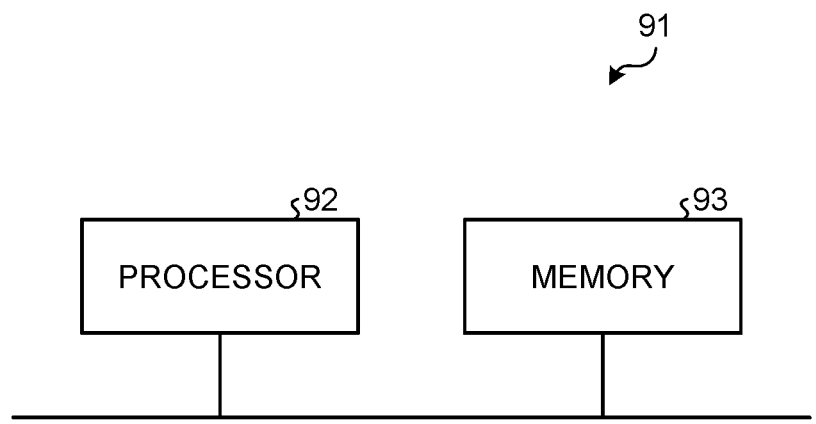
FIG. 15 is a diagram illustrating a configuration of a control circuit for implementing the functions of the transmission device and the reception device according to the first embodiment.

In a case where the processing circuitry is implemented by a control circuit using a CPU, the control circuit is a control circuit 91 having a configuration illustrated in FIG. 15, for example. FIG. 15 is a diagram illustrating a configuration of the control circuit 91 for implementing the functions of the transmission device 200 and the reception device 500 according to the first embodiment. As illustrated in FIG. 15, the control circuit 91 includes a processor 92, and a memory 93. The processor 92 is a CPU, and is also referred to as a computing device, a microprocessor, a microcomputer, a digital signal processor (DSP), or the like. The memory 93 is a nonvolatile or volatile semiconductor memory such as a random access memory (RAM), a read only memory (ROM), a flash memory, an erasable programmable ROM (EPROM), or an electrically EPROM (EEPROM; registered trademark), a magnetic disk, a flexible disk, an optical disk, a compact disc, a mini disc, a digital versatile disk (DVD), or the like, for example.

In a case where the processing circuitry is implemented by the control circuit 91, the processing circuitry is implemented by the processor 92 reading and executing programs corresponding to the processes of the respective components stored in the memory 93. In addition, the memory 93 is also used as a temporary memory in processes performed by the processor 92. Note that computer programs to be executed by the control circuit 91 may be provided via a communication channel, or may be stored on a storage medium and provided therefrom.

Alternatively, some of the functions of the transmission device 200 and the reception device 500 may be implemented by dedicated circuitry, and others may be implemented by programs and a control circuit using a CPU.

As described above, according to the present embodiment, measurement of interference amounts can be performed by using null symbols added in received packets. In a case where a non-transmission section is provided to measure the interference amount, the timing at which the interference amount is measured is limited to the non-transmission section, and communication is interrupted during the non-transmission section, which lowers the transmission data rate. In contrast, in the case where null symbols are used to measure the interference amount, the interference amount can be measured at any timing during communication, and this enables measurement of the interference amount while preventing the data rate from lowering.

In addition, according to the present embodiment, transmission timing is controlled to reduce interference. Changing the hopping pattern can also be considered as a method for reducing interference, but in this case, the frequency channels that are used overlap with each other with a certain probability, which may lower the communication quality. In contrast, by the method of controlling transmission timing, correction can be made to make the transmission timing closer to the synchronous state, which enables interference to be reduced more reliably than the method of changing the hopping pattern.

While network synchronization is presented as an example of a synchronization method for the entire radio communication system 100 in the embodiment described above, the present embodiment is not limited to this example. For example, synchronization using radio may be performed among the controlling devices 101-1, 101-2, and 101-3. In addition, while the radio communication system 100 includes three subsystems 103-1, 103-2, and 103-3 in the embodiment described above, the number of subsystems is not limited up to the number of hopping channels.

While the hopping patterns 104-1, 104-2, and 104-3 in which eight channels are used and one period is constituted by eight sequences are presented as an example in the embodiment described above, the present embodiment is not limited the example. The number of hopping channels and the hopping patterns are not limited those in the example described above, and may have any structures. Note that the number of hopping channels is the number of subsystems that can perform communication at the same time without interference within a system. Thus, as the number of hopping channels is larger, more subsystems can perform communication without interference.

In addition, while one transmission packet 301 includes four OFDM symbols 302, and one OFDM symbol 302 is constituted by a total of 32 symbols including eight subcarriers arranged in the frequency axis direction and four symbols arranged in the time axis direction in the embodiment described above, the present embodiment is not limited to these examples. In addition, the arrangement of the null symbols 402 described above is also an example, and the arrangement is not limited to the described example. The structure of a packet, the number of mapped null symbols, the mapping method, and the like are not limited to those in the examples described above, and any method can be used.

In addition, while the interference amount processing unit 508 averages the measured interference amounts at the null symbols 402 for each OFDM symbol 302 in the embodiment described above, the present embodiment is not limited to this example. The interference amount processing unit 508 can average the interference amounts in predetermined units. For example, the interference amount processing unit 508 may average the interference amounts for each predetermined time, or may average the interference amounts for every predetermined number of symbols.

In addition, while a result the processing of the interference amount processing unit 508 is used for correction of transmission timing in the embodiment described above, the present embodiment is not limited to this example. For example, the result of processing of the interference amount processing unit 508 may be used for monitoring interference at packet reception time, or may be used for determining correct transmission timing so that the controlling device 101-1 that has lost synchronization recovers to the synchronous state on the basis of the transition of the interference amount.

In addition, while the timing control unit 509 plots the results of processing of the interference amount processing unit 508 in the time axis, and calculates a control amount of transmission timing by using the temporal transition of the interference amount in the embodiment described above, the present embodiment is not limited to this example. For example, when variation of interference from outside the radio communication system 100 is large, a regression line calculated by using a least-squares method on the interference amount for each received packet 601 and that for each OFDM symbol 302 can be used or a standard deviation in addition to the regression line can be used instead of simple temporal transitions, which enables a control amount of transmission amount to be more accurately obtained.

In addition, while the timing control unit 509 holds, as the termination determination value 702, an interference amount when the slope has become equal to or larger than the first threshold on the basis of the temporal transitions of the interference amounts, and uses the termination determination value 702 to determine whether to terminate correction of transmission timing in the embodiment described above, the present embodiment is not limited to this example. For example, a third threshold of the interference amount may be provided, and correction of transmission timing may be terminated when the interference amount has become equal to or smaller than the third threshold.

In addition, while the radio communication devices are the controlling devices 101-1, 101-2, and 101-3 and the controlled devices 102-1, 102-2, and 102-3 in the embodiment described above, the present embodiment is not limited to this example. The technology of the present embodiment is applicable to radio communication device capable of performing communication using frequency hopping.

A radio communication device according to the present disclosure produces an effect of enabling measurement of the interference amount while preventing the transmission data rate from lowering.

The configurations presented in the embodiment above are examples, and can be combined with other known technologies or with each other, or can be partly omitted or modified without departing from the gist.

What is claimed is:

1. A radio communication device that switches a frequency channel to be used by using a predetermined hopping pattern during communication with a counterpart radio communication device, the radio communication device comprising:
   a null determination circuitry to determine a position of a null symbol included in a received packet from the counterpart radio communication device;
   an interference measuring circuitry to measure an interference amount by using the null symbol included in the received packet; and
   a timing control circuitry to calculate a control amount of transmission timing for transmitting a transmission packet to the counterpart radio communication device on the basis of the interference amount, wherein
   the received packet includes modulated symbols to which a modulated signal and the null symbol are mapped by frequency mapping,
   the interference measuring circuitry measures an interference amount for each of the modulated symbols constituting one received packet, and
   the timing control circuitry calculates a correction value for each of the modulated symbols on the basis of the interference amount for each of the modulated symbols and a maximum value of interference amounts held in advance, and calculates the control amount on the basis of the correction value for each of the modulated symbols.

2. The radio communication device according to claim 1, wherein the timing control circuitry calculates the control amount when a slope of the interference amount for each received packet has become equal to or larger than a first threshold.

3. The radio communication device according to claim 2, wherein the timing control circuitry holds, as a termination determination value, the interference amount when the slope of the interference amount for each received packet has become equal to or larger than the first threshold, repeats calculation of the control amount, and terminates calculation of the control amount when a difference between the interference amount and the termination determination value has become equal to or smaller than a second threshold.

4. A radio communication system comprising:
   a plurality of subsystems each including a radio communication device that switches a frequency channel to be used by using a predetermined hopping pattern during communication with a counterpart radio communication device, the radio communication device comprising:
   a null determination circuitry to determine a position of a null symbol included in a received packet from the counterpart radio communication device; and an interference measuring circuitry to measure an interference amount by using the null symbol included in the received packet the received packet includes modulated symbols to which a modulated signal and the null symbol are mapped by frequency mapping, a timing control circuitry to calculate a correction value for each of the modulated symbols on the basis of the interference amount for each of the modulated symbols and a maximum value of interference amounts held in advance, and calculates a control amount on the basis of the correction value for each of the modulated symbols, wherein different hopping patterns are used by different subsystems during communication, and a position at which the null symbol is added in a transmission packet differ from one subsystem to another.

* * * * *